E. W. ANDERSON.
Vehicle Seats and Bodies.
No. 158,822.
Patented Jan. 19, 1875.
4 Sheets--Sheet 1.
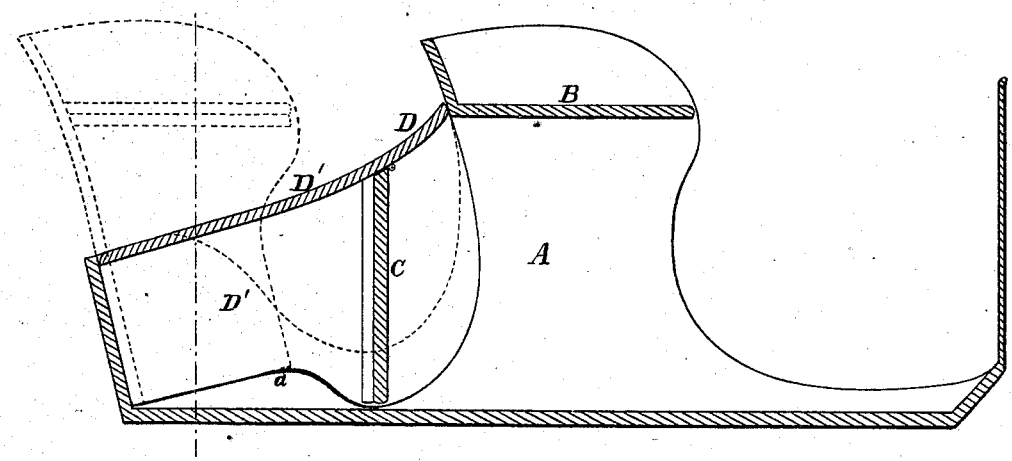
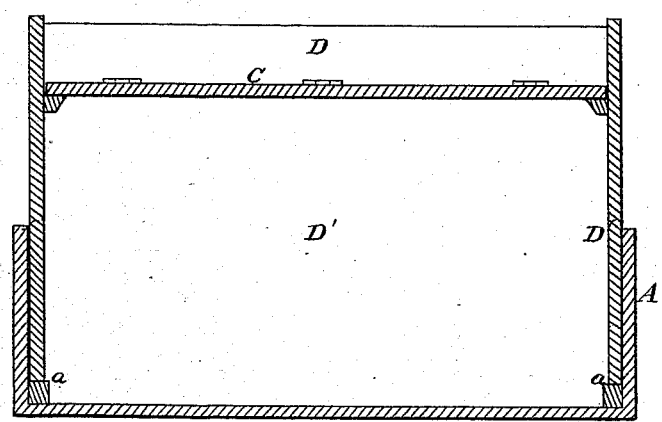
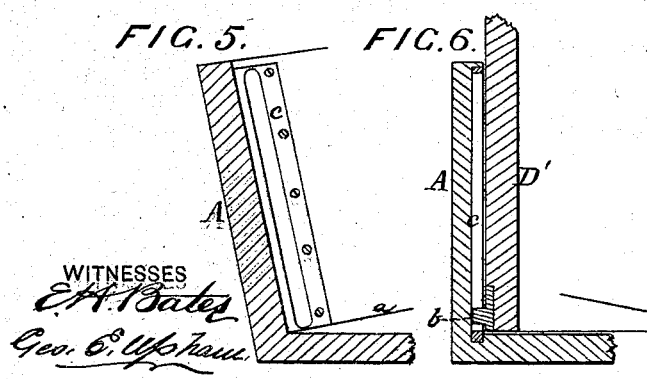
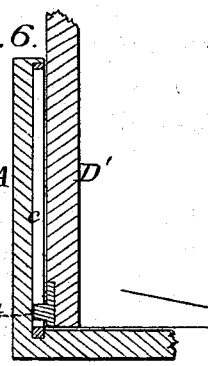
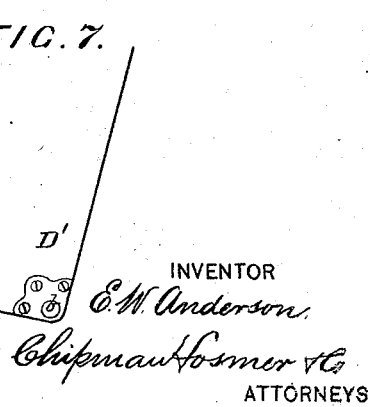

4 Sheets--Sheet 2.

E. W. ANDERSON.
Vehicle Seats and Bodies.

No. 158,822.  Patented Jan. 19, 1875.

WITNESSES
E. H. Bates
Geo. E. Upham

INVENTOR
E. W. Anderson
Chipman Hosmer & Co.
ATTORNEYS

4 Sheets--Sheet 3.

E. W. ANDERSON.
Vehicle Seats and Bodies.

No. 158,822. Patented Jan. 19, 1875.

WITNESSES
E. H. Bates
Geo. E. Upham

INVENTOR
E. W. Anderson,
Chipman Hosmer & Co.
ATTORNEYS

E. W. ANDERSON.
Vehicle Seats and Bodies.

No. 158,822.

4 Sheets--Sheet 4.

Patented Jan. 19, 1875.

WITNESSES

INVENTOR

ATTORNEYS

UNITED STATES PATENT OFFICE.

EDWARD W. ANDERSON, OF WASHINGTON, DISTRICT OF COLUMBIA.

IMPROVEMENT IN VEHICLE SEATS AND BODIES.

Specification forming part of Letters Patent No. 158,822, dated January 19, 1875; application filed December 12, 1874.

*To all whom it may concern:*

Be it known that I, EDWARD W. ANDERSON, of Washington, in the District of Columbia, have invented a new and valuable Improvement in Vehicles; and I do hereby declare that the following is a full, clear, and exact description of the construction and operation of the same, reference being had to the annexed drawings, making a part of this specification, and to the letters and figures of reference marked thereon.

Figure 3:
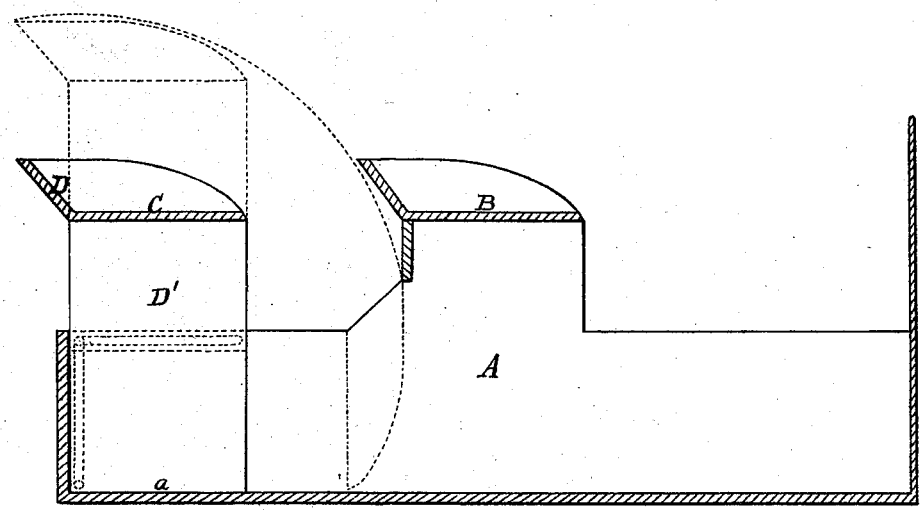
Figure 4:
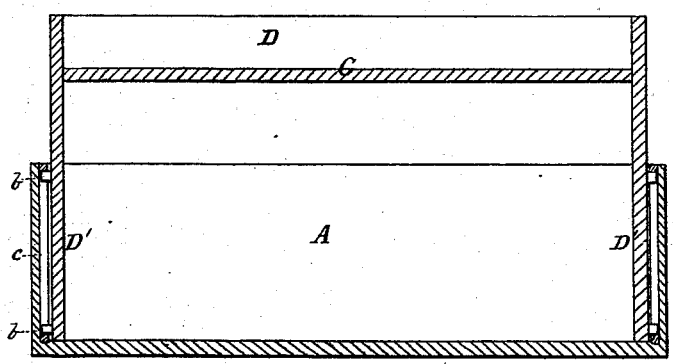
Figure 8:
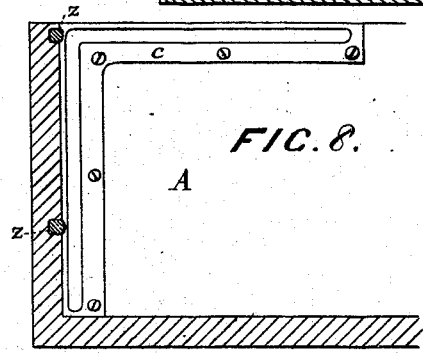
Figure 9:
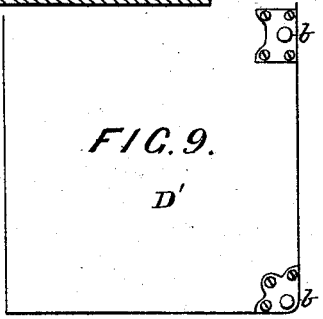
Figure 10:
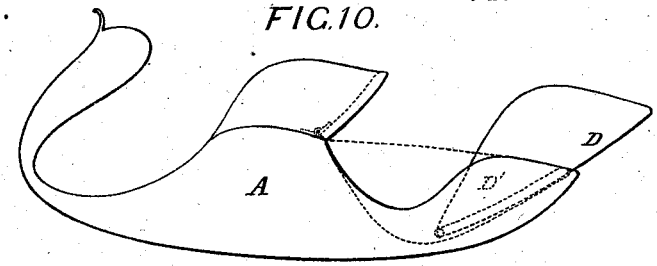
Figure 11:
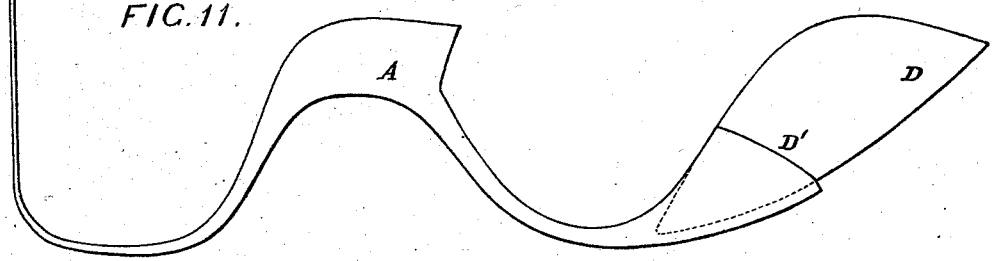
Figure 12:
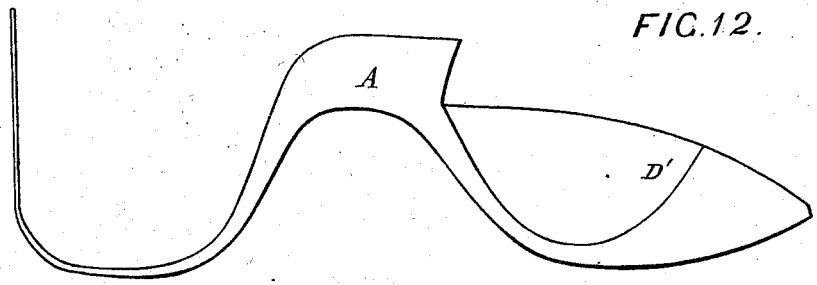
Figure 13:
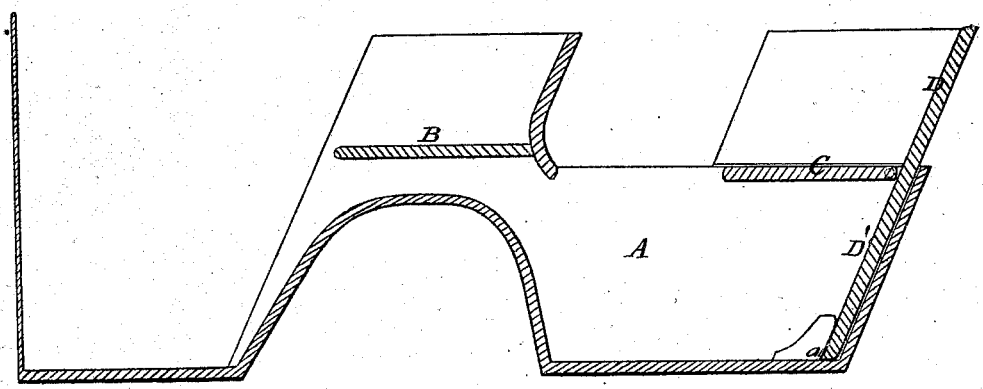

Figures 1, 3, 13, and 14 of the drawings are representations of vertical longitudinal sections of vehicles, showing this invention. Figs. 2 and 4 are vertical transverse sections. Figs. 5, 6, 7, 8, and 9 are details. Figs. 10, 11, 12, and 15 are side views, illustrating this invention.

This invention has relation to the seats of vehicles; and it consists in the construction and novel arrangement of a seat or a seat-back having a rigid extension below the plane of the seat, and adapted to first rise or slide by a movement of reciprocation, and then fold forward by a movement of vibration, as hereinafter fully shown and described.

In the drawings accompanying this specification I have illustrated some applications of this invention, showing different modes of carrying it into practical effect. A detailed description will be given of the mode of applying it to a buggy, or other single-seat vehicle of any of the ordinary styles, so that it can be readily and quickly converted into a double-seat carriage.

The letter A of the drawings designates the body of the vehicle, having an extension or boot in rear of the front seat, B. C indicates the rear seat, which may be attached to the rear seat-back, D, and move with it, as illustrated in this mode of application. The movable seat-back D is constructed with an extension, D', below the plane of the seat, and in this instance forming a standard therefor, as shown in the drawings, and for this purpose extending, when the back is in the upright position, downward to a secure foundation or bearing at or near the bottom of the box, as indicated at *a*. When the seat is designed to rake a little to the rear, in accordance with the design of the vehicle, as indicated in Fig. 1, the bearings for the sides of the standard may be conveniently made in the form of inclined ledges, to give a desirable solidity. If the boot is designed to be covered when the seat is folded down the back panel of the seat-back should be continued in an unbroken manner to the foot of the extension thereof. It will then, when the seat-back is folded down, form a complete and unbroken top to the boot, and give it a finished and workmanlike appearance.

The movable seat-back D is preferably connected with the body of the vehicle, although this is not always essential, and I have illustrated certain devices whereby it may be readily accomplished; but various modes of connection will readily occur to those skilled in the art, which will serve the purpose in an excellent manner.

To the side walls of the body are securely fastened slotted plates *c*, which are designed to engage with studs *b*, secured to the sides of the seat-back, and serve to govern the movement thereof, and to secure the seat-back to the body so that it cannot be tipped out. When this seat is not needed for use the seat-back is first raised a certain distance, and then folded forward and downward, assuming the position indicated in Fig. 1 of the drawings. When needed for use the seat-back must first be drawn upward and backward, and then pushed down until its extension or standard rests on its bearings at or near the bottom of the box. Connecting devices are preferably employed to permit this movement and regulate it, and they will serve to prevent accident from the tilting of the seat-back. When additional firmness or rigidity is required suitable stops may be provided for the feet of the extension; or, in some constructions, a groove-and-tenon connection may be employed. Sometimes a right-angle slot, having branches running in the direction of the length and depth of the box, will be found very useful, two slide-studs being employed in connection therewith, thereby relieving the back of the box from pressure, and preventing the back of the back panel from being bruised. Other advantageous connecting devices may be employed without departing from the principle of my invention, and such will, without doubt, readily occur to those skilled in the art. Hence I do not desire to be confined to the construction herein described.

In order to prevent any bruising of the parts of the seat-back which may be in contact with the box-wall at one time and exposed at another, I may make use of the ordinary rubber cushion, as indicated at z in the drawings, of listing, or of such other bearings as may be suitable for the purpose; or the contact of the parts may be obviated by the mechanical construction as described above, or in any suitable manner.

In order that ready access to the boot may be had for stowage and other purposes when the seat is folded down, and the back panel is extended to cover the boot, it is advisable to provide a hinged seat-board, which can be swung forward under the front seat, B.

When the side walls of the body of the vehicle are sufficiently high the seat C may be connected directly therewith, and the seat-back alone may be arranged to have the rising and folding movement, carrying it forward over the seat, so as to cover it from view when not required for use.

Figure 14:
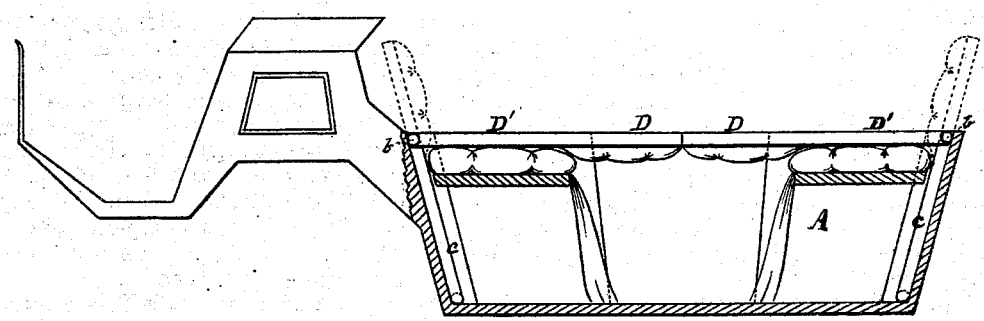
Figure 15:
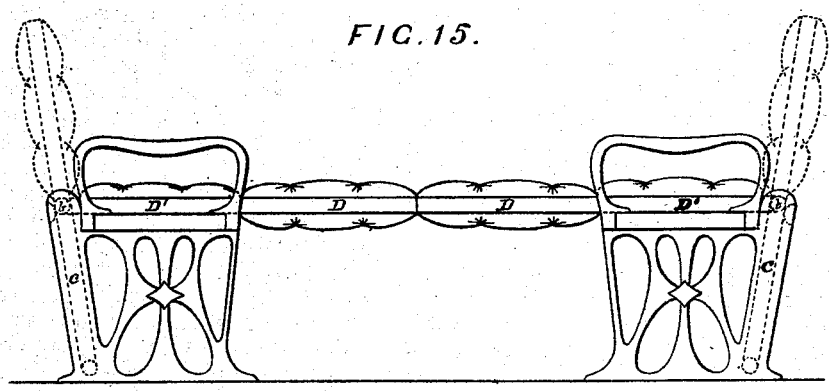

In Fig. 14 I have illustrated an open carriage having in rear of the driver's seat a front and back seat, each provided with a rising and folding seat-back. These are designed, when folded down over the seats, to meet each other across the middle portion of the box, covering the same completely, and effectually protecting the upholstery from dust and dampness when the vehicle is not in use.

If the backs are of such design that they will form a continuous plain surface when folded down the vehicle will be very serviceable if there should be occasion to convey an invalid in the recumbent posture.

Ambulances may readily be constructed with this sliding and folding seat-back, so as to serve a very convenient purpose; and in sleeping-cars the opposite seats of a compartment may be provided therewith, so that a berth may be readily and quickly formed.

When this improvement has side extensions or standards, as shown in Fig. 1, the side walls of the box or boot may be cut away to form entrances, facilitating materially the use of the boot-seat for ladies.

What I claim as new, and desire to secure by Letters Patent, is—

1. A rising and folding seat-back having a rigid extension below the plane of the seat, to operate substantially as set forth.

2. The combination, with a vehicle, of a seat or seat-back to slide and fold by successive movements, and provided with a rigid extension below the plane of the seat and suitable connecting devices, substantially as specified.

3. The combination, with the boot or body of a vehicle, cut away to form entrances through its wall, of a rising and folding seat having side standards, to operate, when folded, to close said entrances, substantially as specified.

4. The combination, with a vehicle boot or extension in rear of the front seat, of a rising and folding seat or seat-back having a back panel extending below the plane of the seat, to operate, when folded, to close said boot or extension and form a covering thereto, substantially as specified.

5. A rising and folding vehicle-seat or seat-back having a stiff extension below the plane of the seat, adapted for sliding connection with a part fixed to the vehicle, and to operate substantially as specified.

In testimony that I claim the above I have hereunto subscribed my name in the presence of two witnesses.

E. W. ANDERSON.

Witnesses:
GEORGE E. UPHAM,
F. J. MASI.